(12) United States Patent
Aoki et al.

(10) Patent No.: US 7,442,417 B2
(45) Date of Patent: Oct. 28, 2008

(54) METHOD FOR REACTION CONTROL COATING

(75) Inventors: Yasuhiro Aoki, Tokyo (JP); Akihiro Sato, Tokyo (JP)

(73) Assignee: IHI Corp., Tokyo (JP)

( * ) Notice: Subject to any disclaimer, the term of this patent is extended or adjusted under 35 U.S.C. 154(b) by 0 days.

(21) Appl. No.: 10/558,685

(22) PCT Filed: Feb. 25, 2004

(86) PCT No.: PCT/JP2004/002186

§ 371 (c)(1),
(2), (4) Date: Nov. 30, 2005

(87) PCT Pub. No.: WO2004/106579

PCT Pub. Date: Dec. 9, 2004

(65) Prior Publication Data

US 2006/0246219 A1    Nov. 2, 2006

(30) Foreign Application Priority Data

May 30, 2003    (JP)    ............................. 2003-154129

(51) Int. Cl.
*C23C 16/06* (2006.01)
*C23C 16/12* (2006.01)

(52) U.S. Cl. .................... 427/419.1; 427/252

(58) Field of Classification Search ........................ None
See application file for complete search history.

(56) References Cited

U.S. PATENT DOCUMENTS

| | | | |
|---|---|---|---|
| 5,935,353 A | 8/1999 | Murphy et al. | |
| 6,306,524 B1 | 10/2001 | Spitsberg et al. | |
| 6,933,052 B2 | 8/2005 | Gorman et al. | |
| 2002/0197502 A1* | 12/2002 | Zhao et al. | .................. 428/632 |
| 2003/0044634 A1 | 3/2003 | Kelly et al. | |
| 2003/0118448 A1 | 6/2003 | Lee et al. | |

FOREIGN PATENT DOCUMENTS

| | | |
|---|---|---|
| EP | 0 532 255 A1 | 3/1993 |
| EP | 0 821 076 A1 | 1/1998 |
| EP | 1 001 046 A1 | 5/2000 |
| JP | 7-238362 | 9/1995 |
| JP | 09-324256 A | 12/1997 |
| JP | 10-168556 A | 6/1998 |
| JP | 11-080920 A | 3/1999 |
| JP | 11-131163 A | 5/1999 |
| JP | 11-172463 A | 6/1999 |
| JP | 2000-192258 A | 7/2000 |

OTHER PUBLICATIONS

Yasuhiro Aoki et al. "Present Situation and Problems in Development of Turbine Blade Materials for Aircraft Engine", Rsearch Report of Heat-resistant Metal Material 123 Committee, Vo. 43, No. 3.
W.S. Waslton et al. "A New Type of Microstructural Instability in Superalloys-SRZ", Superalloys, 1996.
International Search Report (PCT/ISA/210), completed May 27, 2004.
Supplementary European Search Report issued in corresponding application No. EP 04 71 4425 completed Nov. 9, 2006 and mailed Nov. 22, 2006.
Office Action issued in related U.S. Appl. No. 10/558,648, dated Jul. 16, 2007.
Office Action issued in related U.S. Appl. No. 10/558,648, dated Mar. 28, 2008.

* cited by examiner

*Primary Examiner*—William P Fletcher, III
(74) *Attorney, Agent, or Firm*—Griffin & Szipl, P.C.

(57) ABSTRACT

A method for reaction control coating includes: (a) a step of applying a reaction control material to a surface of an Ni-base superalloy before applying aluminum diffusion coating to the Ni-base superalloy, wherein the reaction control material is Co, Cr or Ru, or an alloy of which main component is selected from the group consisting of Co, Cr, and Ru; and (b) a step of applying the aluminum diffusion coating to the Ni-base superalloy.

14 Claims, 9 Drawing Sheets

TMS-121, TCP PHASE

TMS-138

BEFORE OXIDATION TEST

β phase, additive layer, diffusion zone

AFTER OXIDATION TEST (1100°C, 500Hr)

β phase, γ' phase, SRZ

OXIDATION TEST RESULT OF AL DIFFUSION COATING TO TEST PIECE TMS-138

SECTIONAL MICROSTRUCTURE OF SEM IMAGE

Ru MAP OF SECTIONAL MICROSTRUCTURE

COMPARISON OF RUPTURE TIME FOR PLATE THICKNESSES OF TMS-138

FIG. 5A  before oxidation test
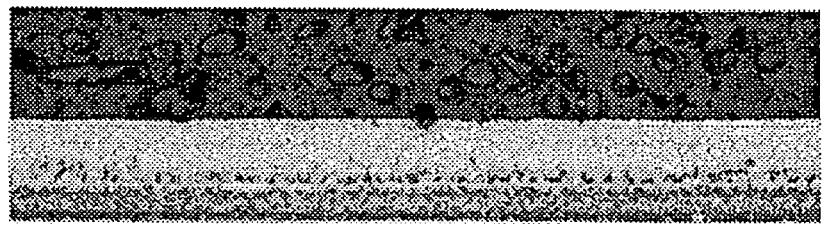
FIG. 5B  after oxidation test (1373K-500Hr)
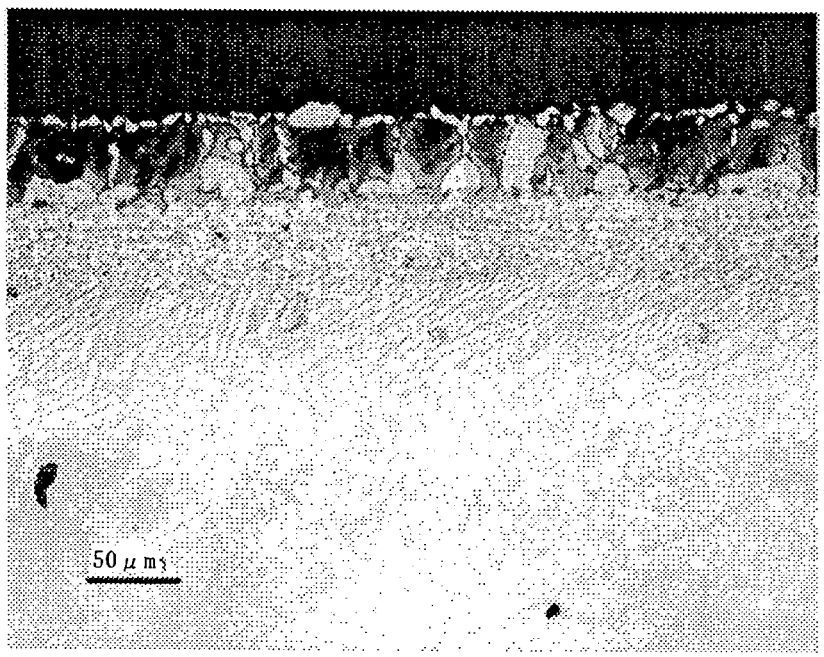
SECTIONAL MICROSTRUCTURE OF DIFFUSION COATING
(RC (Ru; CONDITION B) + Al DIFFUSION COATING)
BEFORE AND AFTER OXIDATION TEST FIG. 6A before oxidation test
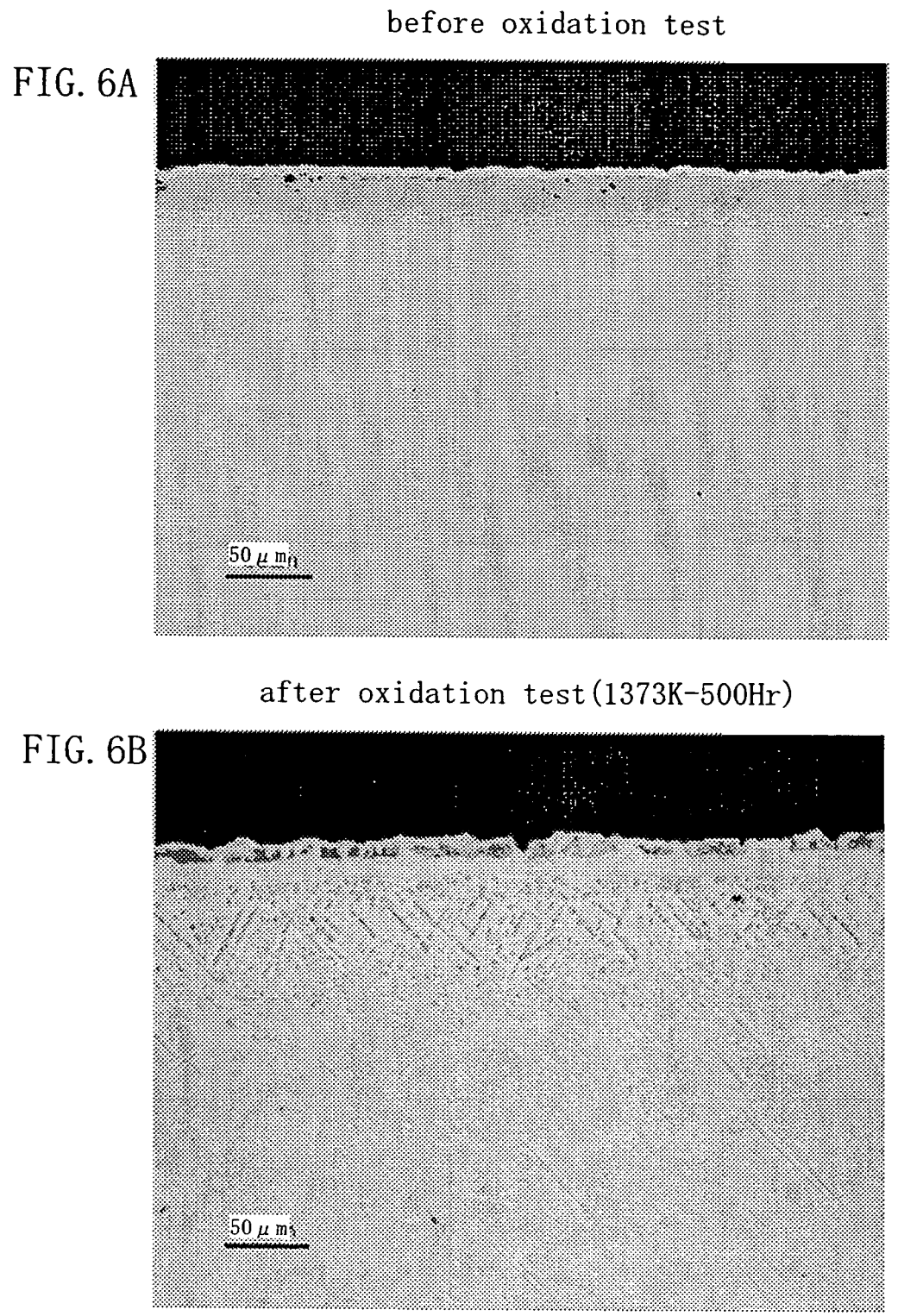
FIG. 6B after oxidation test (1373K-500Hr)
SECTIONAL MICROSTRUCTURE OF DIFFUSION COATING
(RC (Co-Ru; CONDITION B) + Al DIFFUSION COATING)
BEFORE AND AFTER OXIDATION TEST FIG. 7A before oxidation test
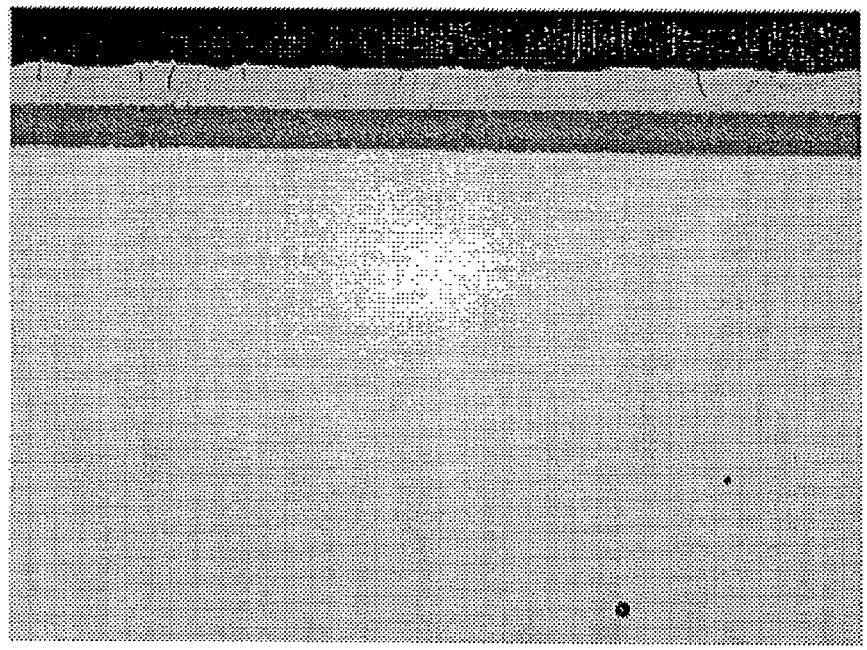
FIG. 7B after oxidation test (1373K-500Hr)
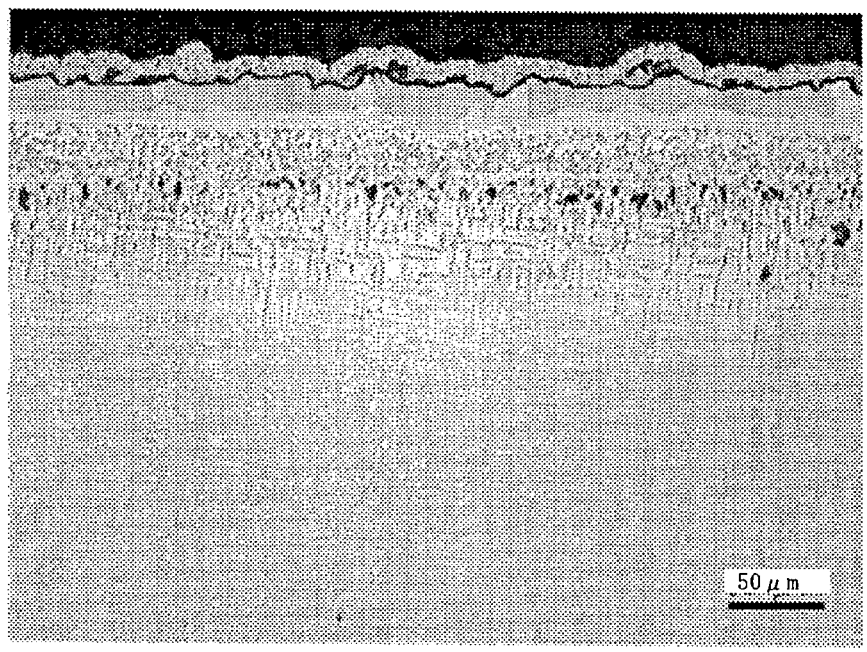
SECTIONAL MICROSTRUCTURE OF AL DIFFUSION COATING WITHOUT RC COATING

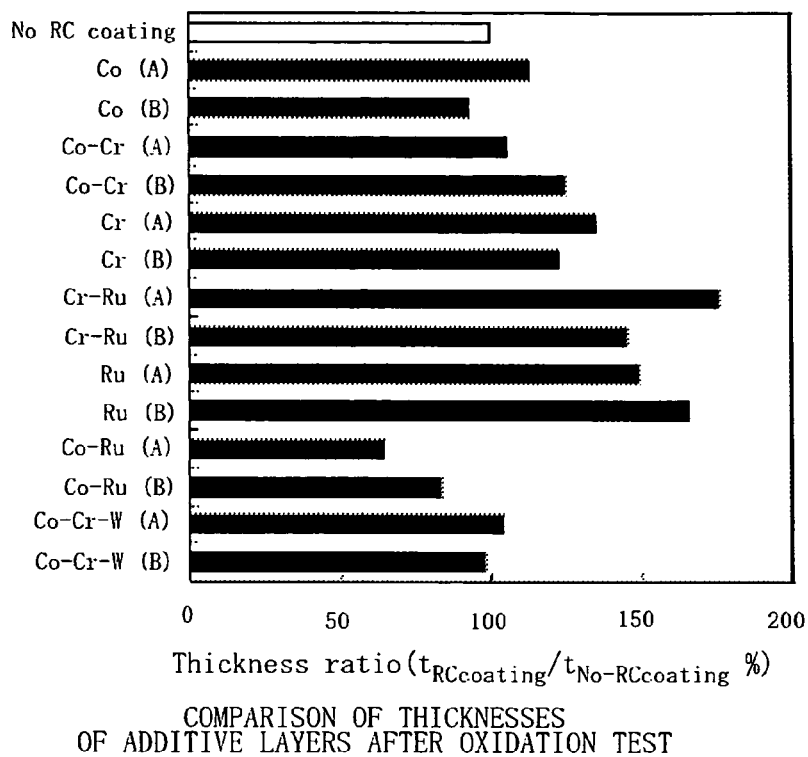
FIG. 8 COMPARISON OF THICKNESSES OF ADDITIVE LAYERS AFTER OXIDATION TEST
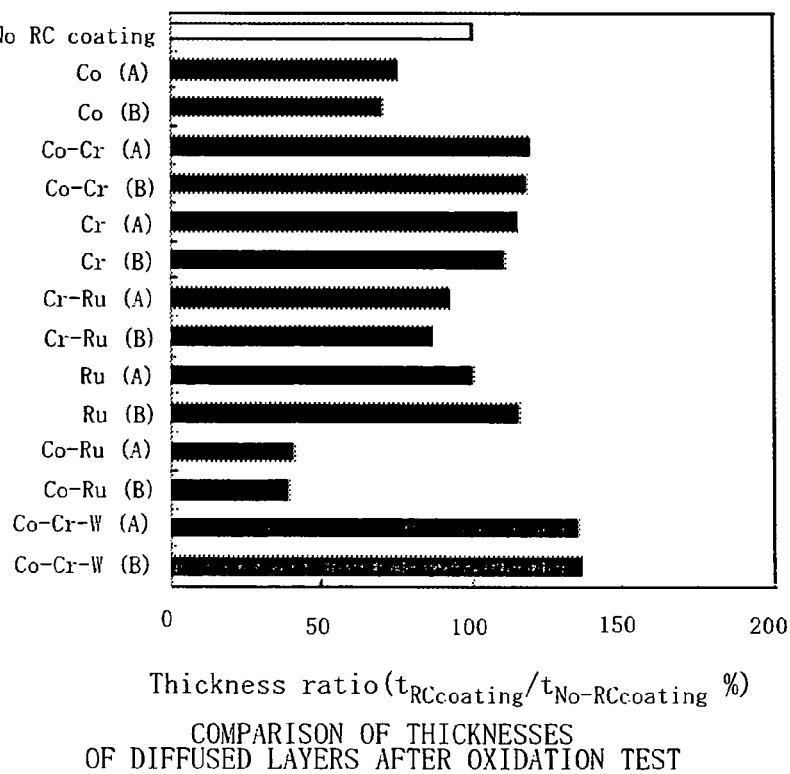
FIG. 9 COMPARISON OF THICKNESSES OF DIFFUSED LAYERS AFTER OXIDATION TEST

COMPARISON OF THICKNESSES
OF SRZ AFTER OXIDATION TEST

COMPARISON OF WEIGHT CHANGES
AFTER OXIDATION TEST

METHOD FOR REACTION CONTROL COATING

This is a National Phase Application in the United States of International Patent Application No. PCT/JP2004/002186 filed Feb. 25, 2004, which claims priority on Japanese Patent Application No. 2003-154129, filed May 30, 2003. The entire disclosures of the above patent applications are hereby incorporated by reference.

BACKGROUND OF THE INVENTION

1. Technical Field of the Invention

The present invention relates to a method for reaction control coating to enhance oxidation resistance of an Ni-base superalloy while controlling the formation of a secondary reaction zone (SRZ).

2. Description of the Related Art

In order to improve the thrust and efficiency of an aircraft engine, high temperature materials constituting it are required to have improved high temperature properties and increased strength. In particular, an Ni-base superalloy used for turbine blades is excellent in high temperature strength, high temperature ductility and oxidation resistance so that the improvement of its properties greatly contributes to the improvement in the performance of the engine. A further improvement in the high temperature properties of the Ni-base superalloy has been made to respond to an increase in the temperature of a turbine inlet or reduction in the amount of cooling air.

A casting method of an Ni-base superalloy was conventional casting, but directional solidification casting has been developed, and then, single crystal casting has been developed. In particular, a single crystal superalloy is added with a heavy element to reinforce its $\gamma'$ precipitate phase or solid solution. The development of the single crystal superalloy has resulted in a first generation superalloy (free of Re), a second generation superalloy (Re content: about 3 wt. %) and a third generation superalloy (Re content: from 5 to 6 wt. %). With an advance in the development, an Re content of the superalloy increases. Table. 1 shows single crystal superalloys typical of each of the first generation to the third generation and their compositions.

TABLE 1

TYPICAL Ni BASE SC SUPERALLOYS AND CHEMICAL COMPOSITIONS THEREOF

| | MATERIAL | Al | Ti | Ta | Nb | Mo | W | Re | Y | Hf | Cr | Co | Ru | Ni |
|---|---|---|---|---|---|---|---|---|---|---|---|---|---|---|
| FIRST GENERATION SC | PWA1480 | 5.0 | 1.5 | 12.0 | — | 4.0 | 8.0 | — | — | — | 10.0 | 5.0 | — | remainder |
| | CMSX-2 | 6.0 | 1.0 | 6.0 | — | 1.0 | 8.0 | — | — | — | 8.0 | 5.0 | — | remainder |
| | Rene'N4 | 3.7 | 4.2 | 4.0 | 0.5 | 2.0 | 6.0 | — | — | — | 9.0 | 8.0 | — | remainder |
| SECOND GENERATION SC | PWA1484 | 5.6 | — | 9.0 | — | 2.0 | 6.0 | 3.0 | — | 0.10 | 5.0 | 10.0 | — | remainder |
| | CMSX-4 | 5.6 | 1.0 | 6.5 | — | 0.6 | 6.0 | 3.0 | — | 0.10 | 6.5 | 10.0 | — | remainder |
| | Rene'N5 | 6.2 | — | 6.5 | — | 1.5 | 5.0 | 3.0 | 0.01 | 0.15 | 7.0 | 7.5 | — | remainder |
| THIRD GENERATION SC | CMSX-10 | 5.7 | 0.2 | 8.0 | 0.1 | 0.4 | 5.0 | 6.0 | — | 0.03 | 2.0 | 3.0 | — | remainder |
| | Rene'N6 | 6.0 | — | 7.0 | 0.3 | 1.0 | 6.0 | 5.0 | 0.01 | 0.20 | 4.0 | 13.0 | — | remainder |
| | TMS-75 | 6.0 | — | 6.0 | — | 2.0 | 6.0 | 5.0 | — | 0.10 | 3.0 | 12.0 | — | remainder |
| | TMS-121 | 6.0 | — | 6.0 | — | 3.0 | 6.0 | 5.0 | — | 0.10 | 3.0 | 6.0 | — | remainder |

The single crystal superalloys of the third generation have the highest temperature capability and have been applied for turbine blades of latest aircraft engines. These superalloys however have problems that as illustrated in FIG. 1A, a needle-like harmful phase called "TCP phase" precipitates after long exposure at high temperatures and their strength decreases with an increase in this TCP phase.

The present inventors and others have already developed a fourth generation single crystal superalloy TMS-138 having, as a result of suppressing TCP formation by the addition of Ru, improved composition stability even after long exposure at high temperatures. FIG. 1B illustrates the microstructure of TMS-138 after creep rupture test. This drawing suggests that the formation of a TCP phase is suppressed. It has been confirmed that TMS-138 is particularly excellent in creep temperature capability, high cycle fatigue strength and low cycle fatigue strength. Table 2 shows the composition of the single crystal superalloy TMS-138.

TABLE 2

CHEMICAL COMPOSITION OF TMS-138

| MATERIAL | Al | Ti | Ta | Nb | Mo | W | Re | Y | Hf | Cr | Co | Ru | Ni |
|---|---|---|---|---|---|---|---|---|---|---|---|---|---|
| TMS-138 | 5.9 | — | 5.6 | — | 2.9 | 5.9 | 4.9 | — | 0.10 | 2.9 | 5.9 | 2.0 | REMAINDER |

The single crystal superalloy described above is notified in Patent Document 1 and Non-patent Document 1, while the TCP phase and SRZ are notified in Patent Documents 2 and 3 and Non-patent Document 2.

In "DIFFUSION BARRIER LAYER" according to Patent Document 2, diffusion barrier coating is applied to an Ni base single crystal alloy (SC), and by aluminum diffusion coating is applied so that the coating layer can have improved oxidation resistance.

In "A method of aluminising a superalloy" according to Patent Document 3, a TCP phase or SRZ which tends to form on the interface between aluminum diffusion coating and SC is modified by a barrier layer.

[Patent Document 1]
Japanese Laid-Open Patent Publication No. 131163/1999, "Ni base single crystal alloy and manufacturing method thereof"

[Patent Document 2]
U.S. Pat. No. 6,306,524

[Patent Document 3]
European Patent Application No. 0821076

[Non-patent Document 1]
Yasuhiro Aoki, et al., "Present situation and problems in development of turbine blade materials for aircraft engine", Research Report of Heat-resistant Metal Material 123 Committee, Vo. 43, No. 3

[Non-patent Document 2]
W. S. Walston, et al., "A NEW TYPE OF MICROSTRUCTURAL INSTABILITY IN SUPERALLOYS-SRZ", Superalloys, 1996

Oxidation resistant coating must be applied to the surface of a turbine blade in order to prevent its high-temperature oxidation. Aluminum diffusion coating has been conventionally applied for this purpose. As a result of oxidation test and rupture test by using, as a test material, the above-described single crystal superalloy (TMS-138) to which aluminum diffusion coating has been applied, the coating causes uniform formation of SRZ as illustrated in FIGS. 2A and 2B, and drastically reduces the creep rupture time as illustrated in FIG. 4.

SUMMARY OF THE INVENTION

The present invention was made to overcome the above-described problems. An object of the present invention is therefore to provide a reaction control coating method capable of enhancing oxidation resistance of an Ni-base superalloy and at the same time, controlling the formation of SRZ.

According to the present invention, there is thus provided a method for reaction control coating, comprising:

a step of applying a reaction control material to the surface of an Ni-base superalloy before applying aluminum diffusion coating to the Ni-base superalloy, the reaction control material is Co, Cr or Ru, or an alloy of which main component is selected from a group consisting of Co, Cr, Ru.

In one preferred embodiment of the present invention, the reaction control material is any one of pure Co, pure Cr, pure Ru, Co—Cr alloy, Co—Ru alloy, Cr—Ru alloy, Co solid solution, Cr solid solution and Ru solid solution. Preferably, the reaction control material is an alloy or solid solution of which main component is Co, Ru or combination thereof, and the alloy or solid solution contains from 0 to 10 at. % of Co and from 90 to 100 at. % of Ru, or contains from 50 to 80 at. % of Co and from 20 to 50 at. % of Ru. More preferably, the reaction control material is an alloy or solid solution of which main component is Co, Ru or combination thereof and the alloy or solid solution contains Co and Ru with a ratio of Co to Ru being 5:95, 10:90, 50:50 or 80:20.

Preferably, the Ni-base superalloy is a single crystal superalloy containing from about 5 to 6 wt. % of Re or a single crystal superalloy not only containing from about 5 to 6 wt. % of Re but also containing Ru. Further, preferably, the Ni-base superalloy is a single crystal superalloy containing at least about 6 wt. % of Re or a single crystal superalloy not only containing at least about 6 wt. % of Re but also containing Ru.

It is especially preferred that the Ni-base superalloy is a TMS-138 alloy containing about 5% of Re and about 2% of Ru, and the reaction control material is a Co—Ru alloy having main components of Co and Ru. Preferably, the Ni-base superalloy is a TMS alloy containing from about 5 to 7% of Re and from about 4 to 7% of Ru, and the reaction control material is a Co—Ru alloy having main components of Co and Ru.

It has been confirmed by Examples that oxidation resistance of an Ni-base superalloy constituting a turbine blade can be heightened, and formation of SRZ can be controlled by coating, prior to aluminum diffusion coating, the Ni-base superalloy with a reaction control material in accordance with the present invention.

This reaction control coating is especially effective when applied to third generation and fourth generation single crystal superalloys which tend to form SRZ by aluminum diffusion coating.

The other objects and advantageous characteristics of the present invention will be clearly understood from the detailed description referring to accompanying drawings.

BRIEF DESCRIPTION OF THE DRAWINGS

FIG. 3A is the cross-sectional SEM image, after the oxidation test, of the microstructure of a test piece subjected to Al diffusion coating, while

FIGS. 5A and 5B are the cross-sectional views of the microstructure of a test piece, which has been coated with pure Ru under condition B and then subjected to aluminum diffusion coating, before and after the oxidation test, respectively;

FIGS. 6A and 6B are the cross-sectional views of the microstructure of a test piece, which has been coated with a Co—Ru alloy under condition B and then subjected to aluminum diffusion coating, before and after the oxidation test, respectively;

FIGS. 7A and 7B are the cross-sectional views of the microstructure of a test piece, which has been subjected only to aluminum diffusion coating, before and after the oxidation test, respectively;

FIG. 8 is a comparison diagram of the thickness among additive layers after the oxidation test;

FIG. 9 is a first comparison diagram of the thickness among the diffused zones (layers) after the oxidation test;

DESCRIPTION OF PREFERRED EXAMPLES

The concept of the present invention will first be described.

Ni base single crystal superalloys are generally called precipitation hardened alloys and they have a γ' phase precipitated in a γ phase which is a matrix. On the other hand, SRZ has a γ phase and TCP phase precipitated in a γ' phase which is a matrix.

Al diffusion coating on the surface of the single crystal superalloy changes the form on the side of the superalloy into the form of SRZ. The γ' phase which is a precipitated phase of the superalloy is coarsened and becomes a matrix of SRZ.

In the present invention, Ru is used not only for controlling the formation of a TCP phase but also controlling the coarsening of the γ' phase.

Figure 1A:
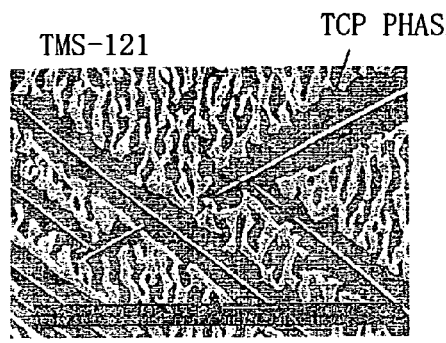
FIGS. 1A and 1B each illustrate the conventional microstructure after creep rupture test.
Figure 1B:
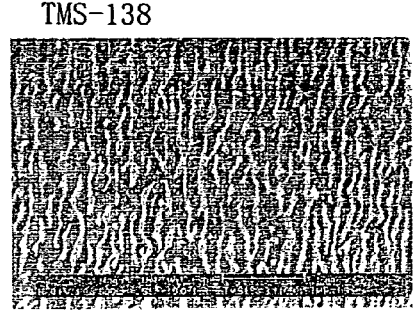
Figure 2A:
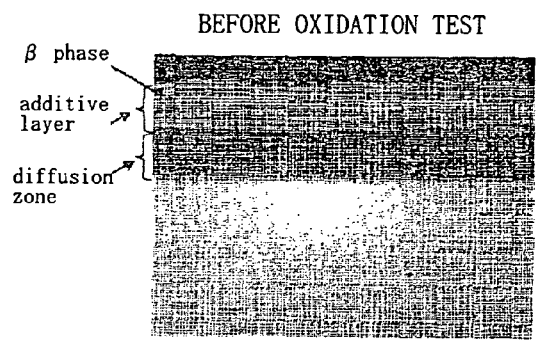
FIGS. 2A and 2B each illustrate the oxidation test results of a test piece subjected to conventional aluminum diffusion coating.
Figure 2B:
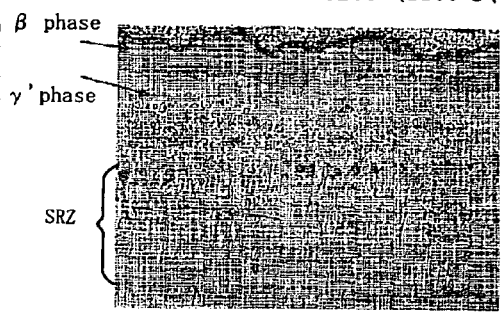
Figure 3A:
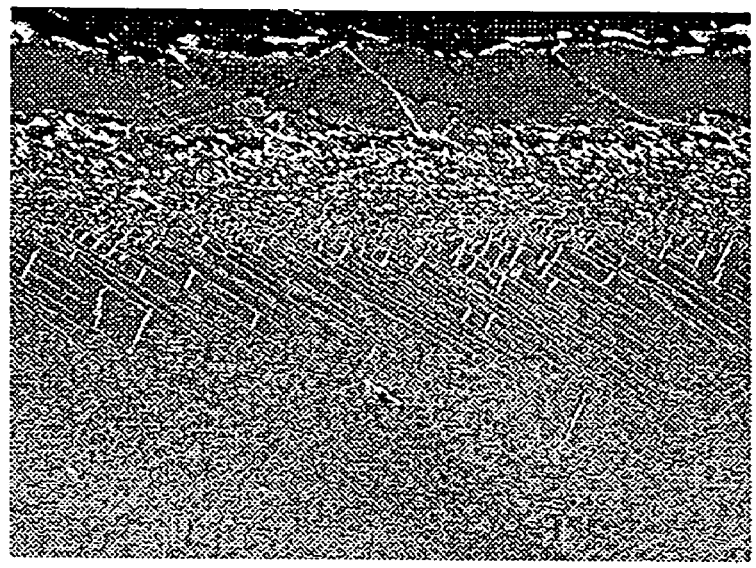
Figure 3B:
FIG. 3B is its Ru map.

FIG. 3A is the cross-sectional SEM image, after the oxidation test, of the microstructure of a test piece subjected to Al diffusion coating, while FIG. 3B shows its Ru map. In FIG. 3B, a portion which is relatively white is abundant in Ru.

As is apparent from this image, Ru has a problem that it moves to the attached side of Al diffusion coating. In the present invention, therefore, Co and Cr are used for suppressing this movement of Ru (not only Ru to be used for reaction control coating but also Ru contained in the superalloy). Moreover, Co and Cr are used for improving the coherence of Ru.

These elements (Ru, Co and Cr) are used also for suppressing diffusion of Al.

In the reaction control coating method according to the present invention, these elements can attain their addition purpose properly when added in respective optimal amounts. The reaction control coating is applied to give a thickness of preferably from 1 to 60 μm, more preferably from 1 to 20 μm, still more preferably from 1 to 10 μm.

Preferred examples of the present invention will next be described with reference to accompanying drawings. In all the drawings, common portions will be identified by same reference numeral, and overlapping description will be omitted.

Example 1

It is necessary to establish an oxidation resistant coating system in order to use a single crystal superalloy such as TMS-138 alloy for a turbine blade of an aircraft engine. Tests were therefore carried out in order to understand a decrease in creep life of a base material owing to the oxidation resistant coating and to evaluate the reaction control coating.

As described above, the influence of aluminum diffusion coating on the TMS-138 alloy by using a thin test plate was researched. As a result, it has been found that a decrease in the creep rupture life occurs with the formation of SRZ.

In this test, therefore, the relationship between a decrease in life owing to the coating and plate thickness is clarified by using test pieces varied in the plate thickness of a base material. At the same time, a variety of coatings having a possibility of controlling the formation of SRZ which will otherwise occur by aluminum diffusion coating are carried out, and their effects on control of SRZ are evaluated. Coating for controlling the formation of SRZ will hereinafter be called "reaction control coating" (RC coating).

(Test Conditions)

(1) Test to Understand a Decrease in Creep Life of a Base Material Caused by Oxidation Resistant Coating Test pieces varied in thickness from 1 to 3 mm were prepared and subjected to aluminum diffusion coating (including aging diffusion). A creep rupture test was carried out in accordance with ASTM E139. Test conditions are 1373 K and 137 MPa. A comparison test was carried out under similar conditions by using a test piece (test piece of bare material) not subjected to aluminum diffusion coating.

(2) Test on Reaction Control Coating

Test pieces were prepared by applying seven RC coatings having a possibility of controlling SRZ to pieces of a TMS-138 alloy having a diameter of 20 mm and thickness ranging from 2 to 3 mm, respectively, and then applying aluminum diffusion coating to them in a similar manner to that described in (1). Types of RC coatings are shown in Table 3.

TABLE 3

| RC COATING CONDITIONS RC material |
| --- |
| 100at % Co |
| 40at % Co-60at % Cr |
| 100at % Cr |
| 80at % Cr-20at % Ru |
| 100at % Ru* |
| 80at % Co-20at % Ru |
| 60at % Co-25at % Cr-15at % W |

After RC coating prior to aluminum diffusion coating, an RC coating material was diffused into a base material under each of two conditions ((A): long diffusion time, (B): short diffusion time). A 500-hour oxidation test was performed to confirm that the formation of SRZ was controlled. A weight change that occurred 500 hours after the oxidation test was also measured.

Before RC coating, the surface of the test piece was polished with an emery paper #800 to lessen the influence of the surface unevenness and residual stressing in the initial state. Oxidation test conditions will be described below. After the oxidation test, the control state of SRZ was evaluated through the observation of the cross-sectional structure.

Oxidation Test Conditions
   Testing temperature: 1373 K
   Testing time: 0, 500 Hr
   Atmosphere: Air (Test Results)

Figure 4:
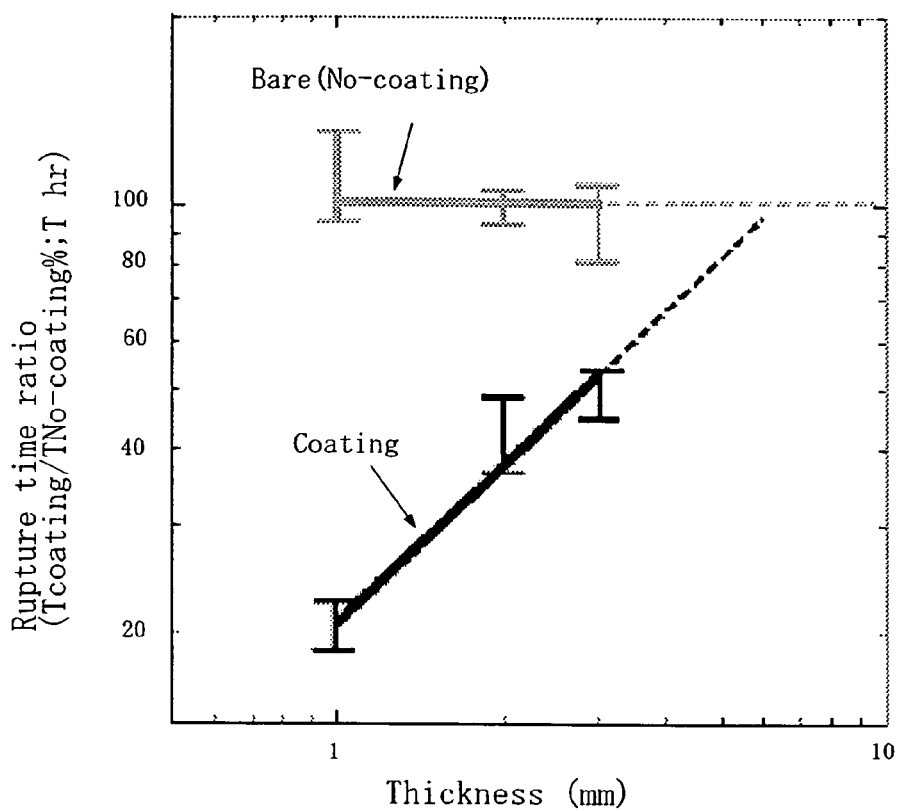
FIG. 4 illustrates the relationship between plate thickness and creep rupture time.

(1) Decrease in Creep Life of a Base Material Owing to Oxidation Resistant Coating FIG. 4 shows the relationship between the plate thickness and creep rupture life. The life is expressed by a value obtained by dividing a measured life by an average life of a bare material. The life of the bare material is almost constant irrespective of a change in plate thickness, but the life of the material subjected to coating decreases as the plate becomes thinner. The relation between the logarithm of a thickness of the coated material and the logarithm of a life can be expressed by a linear function in this diagram. When a value at which the influence of coating can be neglected is extrapolated, the minimum plate thickness and minimum area are expected to be about 6 mm and 18 $mm^2$.

(2) Evaluation of Reaction Control Coating

FIGS. 5A and 5B and FIGS. 6A and 6B show examples of the observation results before and after the oxidation test. That is, these figures show the cross-sections of the test pieces subjected to RC coating+aluminum diffusion coating. For comparison, FIGS. 7A and 7B show the observation results of the cross-sections of the test pieces subjected only to aluminum diffusion coating. From the cross-section of any one of the test pieces before oxidation test, no SRZ was observed. From the cross-section of any one of the test pieces after the oxidation test, SRZ was observed.

For quantitative evaluation, the thicknesses of the coating layer (additive layer, diffused zone (layer)) and the thickness of SRZ on their cross-sections were made dimensionless by the respective values on the cross-section of the test piece subjected to only aluminum diffusion coating.

Figure 10:
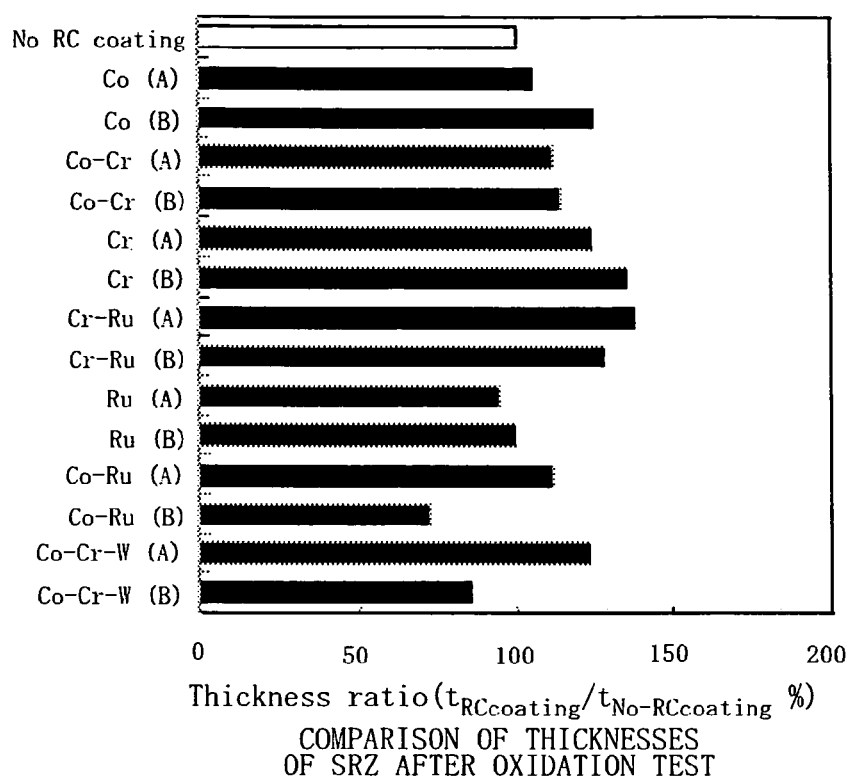
FIG. 10 is a first comparison diagram of the thickness among SRZs (secondary reaction zones) after the oxidation test.

FIGS. 8 to 10 respectively show the values of the additive layer, diffused layer and SRZ, which have thus been made dimensionless. These values are arranged in accordance with types of RC coatings. In each diagram, the value when no RC coating is applied is indicated as 100 on the transverse axis. (A) and (B) indicate respective diffusion times before aluminum diffusion coating (A: long diffusion time, B: short diffusion time).

Coating materials evaluated can be classified roughly into three groups, that is, Co materials (Co, Co—Cr and Co—Ru), Cr materials (Cr, Co—Cr, and Cr—Ru), Ru materials (Ru, Co—Ru and Cr—Ru) and ternary material (Co—Cr—W). These coating materials will hereinafter be called "reaction control materials".

FIG. 8 is a comparison diagram of the thickness among additive layers after the oxidation test. From this diagram, it has been understood that the additive layers of pure Co (B) and Co—Ru alloy have remarkably small thickness.

FIG. 9 is a first comparison diagram in the thickness among diffused layers after the oxidation test. From this diagram, it has been understood that the diffused zones of pure Co (A) and (B) and Co—Ru alloy (A) and (B) have remarkably small thickness.

FIG. 10 is a first comparison diagram in the thickness among SRZs (secondary reaction zones) after the oxidation test. From this diagram, it has been understood that the secondary reaction zones of Co—Ru alloy (B) and Co—Cr—W alloy (B) have remarkably small thickness.

As shown in FIG. 10, when the thickness of SRZ on the cross-section of the test piece subjected to RC coating using Co—Ru is compared with that on the cross-section of the test piece subjected to only aluminum diffusion coating, the former thickness is controlled by about 30%. It can be considered that the formation of SRZ is controlled as a result of suppression control of aluminum element or stabilization of the coating layer. Similar effects can be expected by changing the coating conditions (thickness, temperature or the like) of the other reaction control materials.

Figure 11:
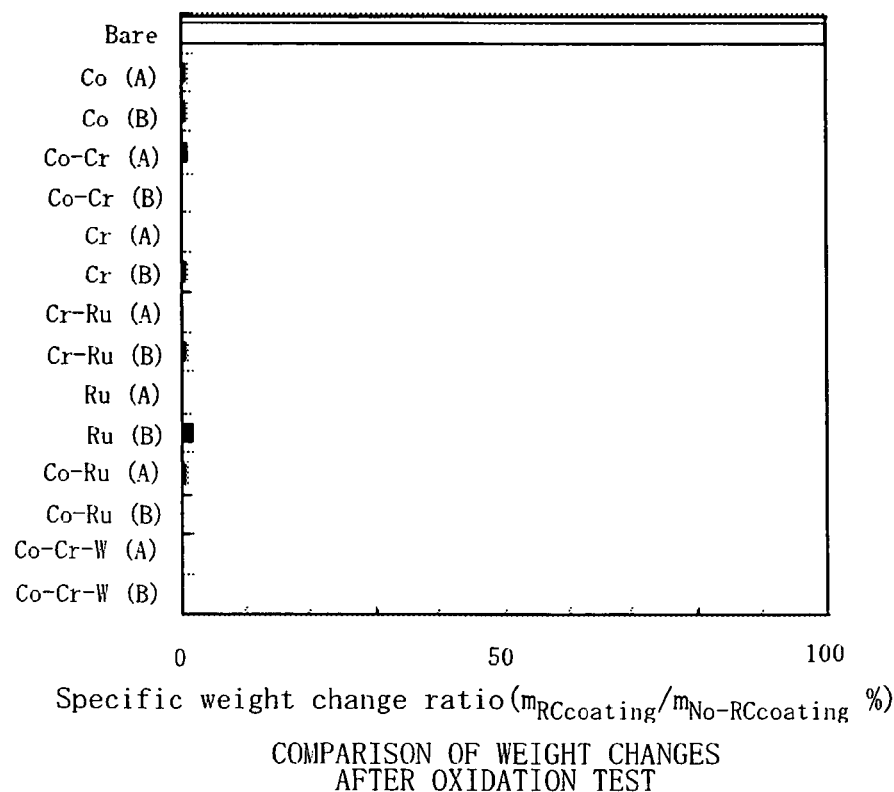
FIG. 11 is a comparison diagram of the weight loss among test pieces after the oxidation test.

FIG. 11 is a comparison in a weight loss among test pieces after the oxidation test. As a weight loss, a measured weight loss made dimensionless by a weight loss of a bare test piece (material without coating) was used. A weight loss of any one of the test pieces subjected to RC coating was about 1% compared with the weight loss of the test piece of the bare material. Judging from a small absolute amount of a weight loss, each coating layer has excellent oxidation resistance.

Example 2

Using RC coating as described in Table 4, a reaction control coating test was performed under similar conditions to those employed in Example 1.

TABLE 4

| RC COATING CONDITIONS |
| --- |
| RC material |
| 50at % Co-50at % Ru |
| 10at % Co-90at % Ru |

Figure 12:
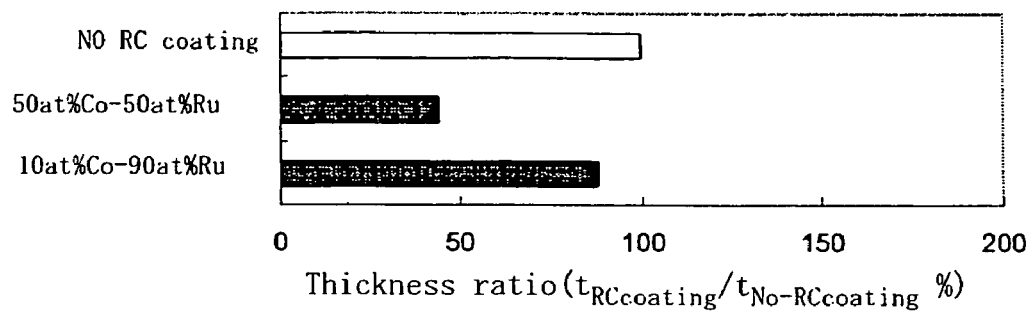
FIG. 12 is a second comparison diagram of the thickness among the diffused zones after the oxidation test.

FIG. 12 is a second comparison diagram of the thickness among diffused zones after the oxidation test. From this diagram, it has been understood that the diffused zone of 50 at. % Co-50 at. % Ru has a remarkably small thickness.

Figure 13:
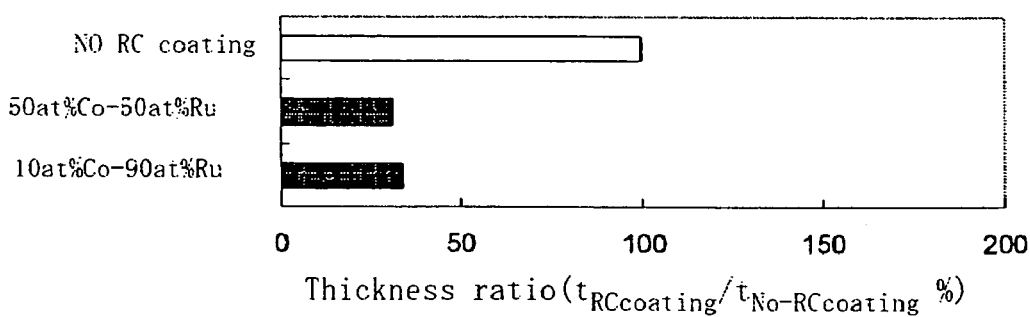
FIG. 13 is a second comparison diagram of the thickness among SRZs (secondary reaction zones) after the oxidation test.

FIG. 13 is a second comparison diagram of the thickness among SRZs (secondary reaction zones) after the oxidation test. From this diagram, it has been understood that the secondary reaction zone of each of 50 at. % Co-50 at. % Ru and 10 at. % Co-90 at. % Ru has a remarkably small thickness.

As described above, it has been confirmed by the above-described examples that the oxidation resistance of an Ni-base superalloy constituting a turbine blade can be enhanced while formation of a secondary reaction zone can be controlled by applying a reaction control material to the superalloy prior to aluminum diffusion coating. In other words, it has been found that this coating (reaction control coating) can not only control the TCP phase and SRZ but also improve the oxidation resistance of a layer subjected to aluminum diffusion coating. This reaction control coating is especially effective for third generation and fourth generation single crystal superalloys which tend to form a second reaction zone by aluminum diffusion coating.

Accordingly, the reaction control coating method according to the present invention has excellent effects such as enhancement of the oxidation resistance of an Ni-base superalloy and control of formation of a second reaction zone.

It is needless to say that the present invention is not limited to the above-described examples and embodiments but can be modified without departing from the scope of the present invention.

The invention claimed is:

1. A method for reaction control coating, comprising the steps of:
   applying a reaction control material to a surface of an Ni-base superalloy before applying aluminum diffusion coating to the Ni-base superalloy, wherein the reaction control material is an alloy or solid solution that consists of only elements selected from the group consisting of Co and Ru, and the alloy or solid solution contains Co that exceeds 0 at. % and is 10 at. % or less and Ru that is at 90 at. % or more and is less than 100 at. %, or contains from 50 to 80 at. % of Co and from 20 to 50 at. % of Ru; and
   applying the aluminum diffusion coating to the Ni-base superalloy.

2. A method for reaction control coating according to claim 1, wherein the Ni-base superalloy is a single crystal superalloy containing from about 5 to 6 wt. % of Re or a single crystal superalloy not only containing from about 5 to 6 wt. % of Re but also containing Ru.

3. A method for reaction control coating according to claim 1, wherein the Ni-base superalloy is a single crystal superalloy containing at least about 6 wt. % of Re or a single crystal superalloy not only containing at least about 6 wt. % of Re but also containing Ru.

4. A method for reaction control coating according to claim 1, wherein the Ni-base superalloy is an alloy containing 5.9 wt. % of Al, 5.6 wt. % of Ta, 2.9 wt. % of Mo, 5.9 wt. % of W, 0.10 wt. % of Hf, 2.9 wt % of Cr, 5.9 wt. % of Co, about 5 wt. % of Re, about 2 wt. % of Ru, and a remainder of Ni.

5. A method for reaction control coating according to claim 1, wherein the Ni-base superalloy is an alloy containing 5.9 wt. % of Al, 5.6 wt. % of Ta, 2.9 wt. % of Mo, 5.9 wt. % of W, 0.10 wt. % of Hf, 2.9 wt % of Cr, 5.9 wt. % of Co, from about 5 to 7 wt. % of Re, from about 4 to 7 wt. % of Ru, and a remainder of Ni.

6. A method for reaction control coating, comprising the steps of:
applying a reaction control material to a surface of an Ni-base superalloy before applying aluminum diffusion coating to the Ni-base superalloy, wherein the reaction control material is an alloy or solid solution that consists of only elements selected from the group consisting of Co and Ru, and the alloy or solid solution contains Co that exceeds 0 at. % and is 10 at. % or less and Ru that is at 90 at. % or more and is less than 100 at. %; and
applying the aluminum diffusion coating to the Ni-base superalloy.

7. A method for reaction control coating according to claim 6, wherein the Ni-base superalloy is a single crystal superalloy containing from about 5 to 6 wt. % of Re or a single crystal superalloy not only containing from about 5 to 6 wt. % of Re but also containing Ru.

8. A method for reaction control coating according to claim 6, wherein the Ni-base superalloy is a single crystal superalloy containing at least about 6 wt. % of Re or a single crystal superalloy not only containing at least about 6 wt. % of Re but also containing Ru.

9. A method for reaction control coating according to claim 6, wherein the Ni-base superalloy is an alloy containing 5.9 wt. % of Al, 5.6 wt. % of Ta, 2.9 wt. % of Mo, 5.9 wt. % of W, 0.10 wt. % of Hf, 2.9 wt % of Cr, 5.9 wt. % of Co, about 5 wt. % of Re, about 2 wt. % of Ru, and a remainder of Ni.

10. A method for reaction control coating according to claim 6, wherein the Ni-base superalloy is an alloy containing 5.9 wt. % of Al, 5.6 wt. % of Ta, 2.9 wt. % of Mo, 5.9 wt. % of W, 0.10 wt. % of Hf, 2.9 wt % of Cr, 5.9 wt. % of Co, from about 5 to 7 wt. % of Re, from about 4 to 7 wt. % of Ru, and a remainder of Ni.

11. A method for reaction control coating, comprising:
applying a reaction control material to a surface of an Ni-base superalloy before applying aluminum diffusion coating to the Ni-base superalloy, wherein the reaction control material is an alloy or solid solution that consists of only Co and Ru, and the alloy or solid solution contains Co and Ru with a ratio of Co to Ru being 5:95, 10:90, 50:50 or 80:20; and
applying the aluminum diffusion coating to the Ni-base superalloy, wherein the Ni-base superalloy is a single crystal superalloy containing at least about 6 wt. % of Re or a single crystal superalloy not only containing at least about 6 wt. % of Re but also containing Ru.

12. A method for reaction control coating, comprising the steps of:
applying a reaction control material to a surface of an Ni-base superalloy before applying aluminum diffusion coating to the Ni-base superalloy, wherein the reaction control material is an alloy or solid solution that consists of only Co and Ru; and the alloy or solid solution contains Co and Ru with a ratio of Co to Ru being 5:95, 10:90, 50:50 or 80:20; and
applying the aluminum diffusion coating to the Ni-base superalloy.

13. A method for reaction control coating, comprising the steps of:
applying a reaction control material to a surface of an Ni-base superalloy before applying aluminum diffusion coating to the Ni-base superalloy, wherein the reaction control material is an alloy or solid solution that consists of only elements selected from the group consisting of Co and Ru, and the alloy or solid solution contains from 5 to 10 at. % of Co and from 90 to 95 at. % of Ru, or contains from 50 to 80 at. % of Co and from 20 to 50 at. % of Ru; and
applying the aluminum diffusion coating to the Ni-base superalloy.

14. A method for reaction control coating, comprising the steps of:
applying a reaction control material to a surface of an Ni-base superalloy before applying aluminum diffusion coating to the Ni-base superalloy, wherein the reaction control material is an alloy or solid solution that consists of only elements selected from the group consisting of Co and Ru, and the alloy or solid solution contains from 5 to 10 at. % of Co and from 90 to 95 at. % of Ru; and
applying the aluminum diffusion coating to the Ni-base superalloy.

* * * * *